United States Patent [19]
Ishiguro

[11] Patent Number: 5,802,866
[45] Date of Patent: Sep. 8, 1998

[54] AIR-COOLED ABSORPTION-TYPE AIR CONDITIONING APPARATUS

[75] Inventor: Katsusuke Ishiguro, Nagoya, Japan

[73] Assignee: Paloma Industries, Ltd., Aichi, Japan

[21] Appl. No.: 878,218

[22] Filed: Jun. 18, 1997

[30] Foreign Application Priority Data

Jul. 25, 1996 [JP] Japan ................................. 8-215422

[51] Int. Cl.⁶ ................................................. F25B 15/00
[52] U.S. Cl. ........................................... 62/324.2; 62/476
[58] Field of Search ......................... 62/101, 476, 324.2, 62/325

[56] References Cited

U.S. PATENT DOCUMENTS

| | | | |
|---|---|---|---|
| 4,872,319 | 10/1989 | Tongu | 62/476 |
| 4,926,659 | 5/1990 | Christensen et al. | 62/476 |
| 5,421,173 | 6/1995 | Lee et al. | 62/485 |
| 5,542,267 | 8/1996 | Lee et al. | 62/485 |
| 5,572,884 | 11/1996 | Christensen et al. | 62/476 |

FOREIGN PATENT DOCUMENTS 6-21743  3/1994  Japan ............................. F25B 30/04

*Primary Examiner*—William Doerrler
*Attorney, Agent, or Firm*—Robin, Blecker & Daley

[57] ABSTRACT

An air-cooled absorption-type air-conditioning apparatus in which a simple design allows for heating and cooling and in addition in which freezing is prevented during the heating operation. A liquid coolant from the condenser is dripped onto the inner surface of the outer pipes in the evaporation-absorption chambers and removes the evaporation heat due to evaporation in low pressure. Therefore, the outer pipes are cooled. Overcooling of the outer pipes is prevented by a fan which directs the heat generated at the condenser to the outer pipes. The evaporated coolant is absorbed in the high-concentration liquid on the outer surface of the water pipes and the absorption heat generated by the high-concentration liquid heats the water flowing in the water pipes. A room unit performs the heating or cooling operation by using warm or chilled water circulating in the water pipes.

2 Claims, 2 Drawing Sheets

AIR-COOLED ABSORPTION-TYPE AIR CONDITIONING APPARATUS

FIELD OF THE INVENTION

This invention relates generally to a method, apparatus and system for heating and cooling, and more particularly to an air-cooled absorption type air conditioner for performing both heating and cooling operations.

BACKGROUND OF THE INVENTION

Conventional technology for air-cooled absorption-type air-conditioning equipment is exemplified by patent Hei 6-21743. The apparatus of this technology is equipped with a first cold/warm water heat exchanger formed using a portion of the circulation passage for the cold/warm water which becomes the coolant in a room air-conditioner, an outer pipe which surrounds the outer circumference of the circulation passage with a certain distance, a first spray mechanism to spray over the outer surface of the first cold/warm water heat exchanger, and the second spray mechanism to spray over the inner surface of the outer pipe. During the cooling operation, coolant vapor flows from the low temperature regenerator to the condenser and is condensed into a liquid coolant. Then, the liquid coolant is sprayed over the outer surface of the first cold/warm water heat exchanger by a first spraying mechanism, and the higher-concentration liquid, which is separated by the low temperature regenerator, is sprayed onto the inner surface of the outer pipe by a second spraying mechanism. The evaporation of the liquid coolant cools the water within the first cold/warm water heat exchanger. The higher-concentration liquid which is sprayed on the inner surface of the outer pipe absorbs the coolant vapor. The absorption heat, which is generated when the higher-concentration liquid absorbs the evaporated coolant, is removed by an air flow on the outer surface of the outer pipe.

Furthermore, during the heating operation, the coolant vapor, which is separated by the phase separator after being heated using a high temperature regenerator, exchanges heat with cold/warm water, which flows through a second cold/warm water heat exchanger in a warm water device. The second cold/warm water heat exchanger is formed using a part of the cold/warm water circulation passage. The liquified coolant is sprayed onto the inner surface of the outer pipe with the second spraying mechanism. The higher concentration liquid which is separated by a phase separator after being heated up by the high temperature regenerator is sprayed over the outer surface of the first cold/warm water heat exchanger through the first spraying mechanism. The liquid coolant absorbs the heat from the air on the outer surface of the outer pipe and evaporates as it is sprayed onto the outer surface of the first cold/warm water heat exchanger and is then absorbed by the higher concentration liquid. The absorption heat which is released at this time warms up the cold/warm water.

However, because the heating operation is performed when the outside air temperature is low, such as during winter, there is a concern in this design that the outer surface will be over cooled by the evaporation of liquid coolant and that the coolant will freeze during the heating operation. In technology to prevent the freezing, a design has been proposed in which the temperature of the liquid coolant is measured and when the temperature decreases below a certain level, further temperature reduction is prevented by introducing a lower concentration liquid. However, such a design is very complicated and becomes very expensive.

Furthermore, in this design a warm water device operated only in a heating mode is used to condense the coolant vapor instead of using the low temperature regenerator and condenser. A problem arises in that the design becomes complicated because the warm water device and a bypass passage must be provided.

It is therefore an object of this invention to provide an air-cooled absorption-type air-conditioning apparatus in which the above problems are solved, which allows for cooling and heating operations using a simple design, and which, furthermore, prevents freezing during the heating operation.

SUMMARY OF THE INVENTION

The air-cooled absorption-type air conditioning apparatus of this invention which solves the above-mentioned problems comprises a regenerator to heat an absorption liquid, and to separate it into a higher concentration absorption liquid from the coolant vapor dissolved in said absorption liquid, a condenser with external fins to condense the coolant vapor from said regenerator, an air conditioning unit to adjust the air temperature by thermal media circulating in circulation pipes, and outer pipes, with external fins, formed concentrically around the outer circumference of said circulation pipes. The cooling operation is performed by chilling the thermal media circulating in the circulation pipes by spraying liquid coolant from the condenser onto the outer surface of the circulation pipes in chambers formed between the circulation pipes and the outer pipes, while at the same time spraying absorption liquid from said regenerator onto the inner surface of said outer pipes. The heating operation is performed by heating the thermal media circulating in the circulation pipes by spraying liquid coolant from the condenser onto the inner surface of the outer pipes, and spraying absorption liquid from the regenerator onto the outer surface of the circulation pipes in the chambers.

A fan blows air in a direction from the outer pipes to the condenser during the cooling operation and in a direction from the condenser to the outer pipes during the heating operation.

The air-cooled absorption-type air-conditioning equipment of this invention which solves the above-mentioned problems may also include a common housing for the fan and the fin assemblies of said condenser and outer pipes, and is designed so that the air flow in each direction during the cooling and heating operations flows substantially over the fins of said condenser and said outer pipes.

During the cooling operation, the air-cooled absorption-type air conditioning equipment of this invention sprays liquid coolant from the condenser onto the outer surface of the circulation pipes, and sprays higher concentration absorption liquid from the regenerator onto the inner surface of the outer pipes in the chambers formed between the circulation pipes and the outer pipes. The liquid coolant evaporates on the outer surface of the circulation pipes. At this time, the liquid coolant absorbs the evaporation heat from the surrounding area and cools the circulation pipes. Thus, the thermal media which circulates through the circulation pipes is cooled allowing chilled air to flow out from the air-conditioning device. The condensation heat generated when the coolant vapor is condensed in the condenser and the absorption heat generated when the absorption liquid absorbs the coolant vapor on the inner surface of the outer pipes are removed by the air blown by the fan in a direction from the outer pipes toward the condenser. The reason for directing the air flow from the outer pipes toward the condenser is that the outer pipes need to be cooled more than the condenser.

On the other hand, during the heating operation, the liquid coolant from the condenser is sprayed onto the inner surface of the outer pipes, and the absorption liquid from the regenerator is sprayed onto the outer surface of the circulation pipes in the chambers formed between the circulation pipes and outer pipes. The liquid coolant evaporates on the inner surface of the outer pipe and the coolant vapor is absorbed by the absorption liquid on the outer surface of the circulation pipes. Absorption heat is generated and warms the circulation pipes which in turn warms the thermal media circulating through the circulation pipes. Thus, warm air will flow out of the air-conditioning device. The outer pipes are cooled because the liquid coolant evaporates from the inner surface of the outer pipes and absorbs evaporation heat from the surrounding area. Because the heating operation usually occurs when the outside air temperature is low, such as during winter, there is a concern that the outer pipes will be over chilled and freeze if the fan blows the air in a direction from the outer pipes to the condenser as is the case in the cooling operation. By directing the flow of air from the condenser to the outer pipes during the heating operation, the air is first warmed by flowing over the condenser and then directed to the outer pipes. Thus, the air heats the outer pipes, and freezing is prevented.

The air-cooled absorption-type air-conditioning equipment of this invention may also be designed to have the condenser and outer pipe fin assemblies and the fan within the same case. In addition, the normal and reverse air flows during the fan's heating and cooling operations flow over the fins of the condenser and the outer pipes. Therefore, no matter in which direction the air flows, the fin assemblies of the condenser and the outer pipe will be cooled or heated.

The accompanying drawings illustrate a preferred embodiment of the invention, as well as other information pertinent to the disclosure.

DETAILED DESCRIPTION

Figure 1:
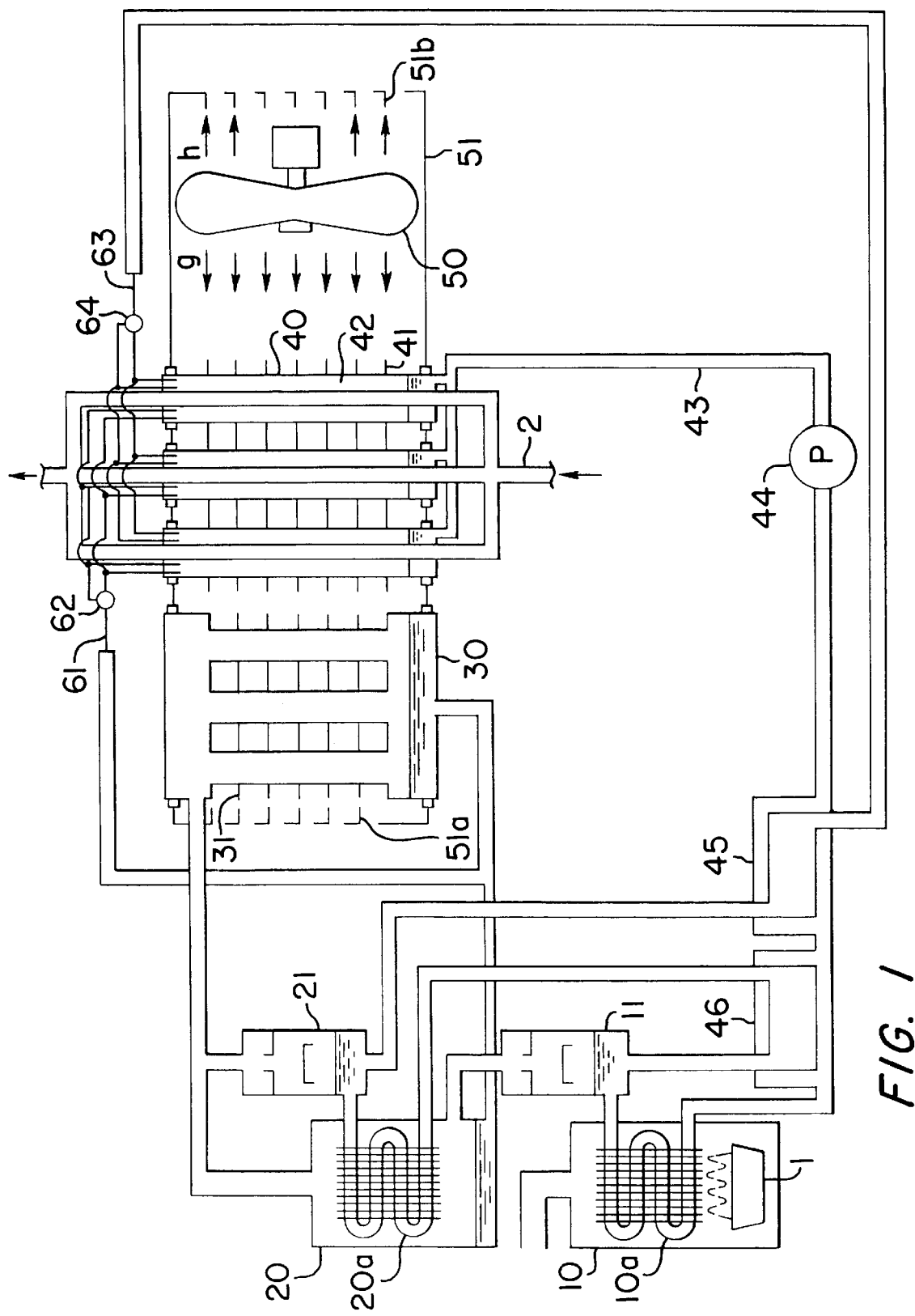
FIG. 1 shows a design layout of the air-cooled absorption-type air-conditioning equipment of this invention.

In order to illustrate this invention and its effectiveness, an example of the air-cooled absorption-type air-conditioning equipment is explained below. FIG. 1 shows a layout for the air-cooled absorption-type air-conditioning equipment of this invention. This air-cooled absorption-type air-conditioning equipment includes a high temperature regenerator 10 which is heated by burner 1, a low-concentration lithium bromide aqua solution (hereinafter, depending on the concentration of lithium bromide, called low-concentration liquid, medium-concentration liquid, and high-concentration liquid) which flows inside a fin-tube-type heat exchanger 10a, a high temperature regenerator phase separator 11, (hereinafter, called high temperature separator), which separates the low concentration liquid heated by the high temperature regenerator 10 into steam and medium concentration liquid, a low temperature regenerator 20 which re-heats the medium concentration liquid that flows within a fin-tube-type heat exchanger 20a by using the steam coming from the high temperature separator, a low temperature regenerator phase separator 21, (hereinafter, called low temperature separator), which separates the medium concentration liquid heated by the low temperature generator 20 into steam and high concentration liquid, and a condenser 30 which cools and liquifies the steam or coolant vapor from the low temperature separator 21. Furthermore, it is equipped with a water pipe 2 which circulates water that cools or heats air for a room unit (not shown in the figures). The room unit circulates air, after its temperature is adjusted by the temperature of the water which circulates in water pipe 2, and performs the cooling and heating operations. Parallel passages are formed in a section of water pipe 2. A concentric outer pipe 40 is provided on the outside of each of the parallel passages of water pipe 2. An independent evaporation absorption chamber 42 is formed between each of water pipes 2 and outer pipes 40. A fan 50 is provided to direct air to the condenser 30 and outer pipes 40. Fins 31 and 41 are provided on both the condenser 30 and the outer pipes 40 in order to enhance the cooling efficiency. Furthermore, the fin assembly of the condenser 30, the fin assembly of the outer pipes 40 and the fan 50 are housed within case 51, in one row. On the side walls of the case 51 which face the condenser 30 and the fan 50, vents 51a and 51b are present.

The condenser 30 and outer pipes 40 are formed air tight against case 51. When fan 50 blows the air in the direction indicated by arrow g, outside air is introduced into the case 51 from the vents 51b, passes over fins 41 and 31, and exits to the outside through vents 51a. In reverse of this, when the fan blows the air in the direction of arrow h, the outer air introduced from the air vents 51a passes over fins 31 and then fins 41, and exits to the outside through the vents 51b.

A circulation pump 44 is provided on the liquid circulation passage 43 from the evaporation-absorption chambers 42 to the high temperature regenerator 10 to circulate the low concentration liquid to the high temperature regenerator 10. A low temperature heat exchanger 45 performs the heat exchange with the high-concentration liquid flowing from the low temperature separator 21 and a high temperature heat exchanger 46 performs the heat exchange with the medium-concentration liquid flowing from the high temperature separator 11 .

Figure 2:
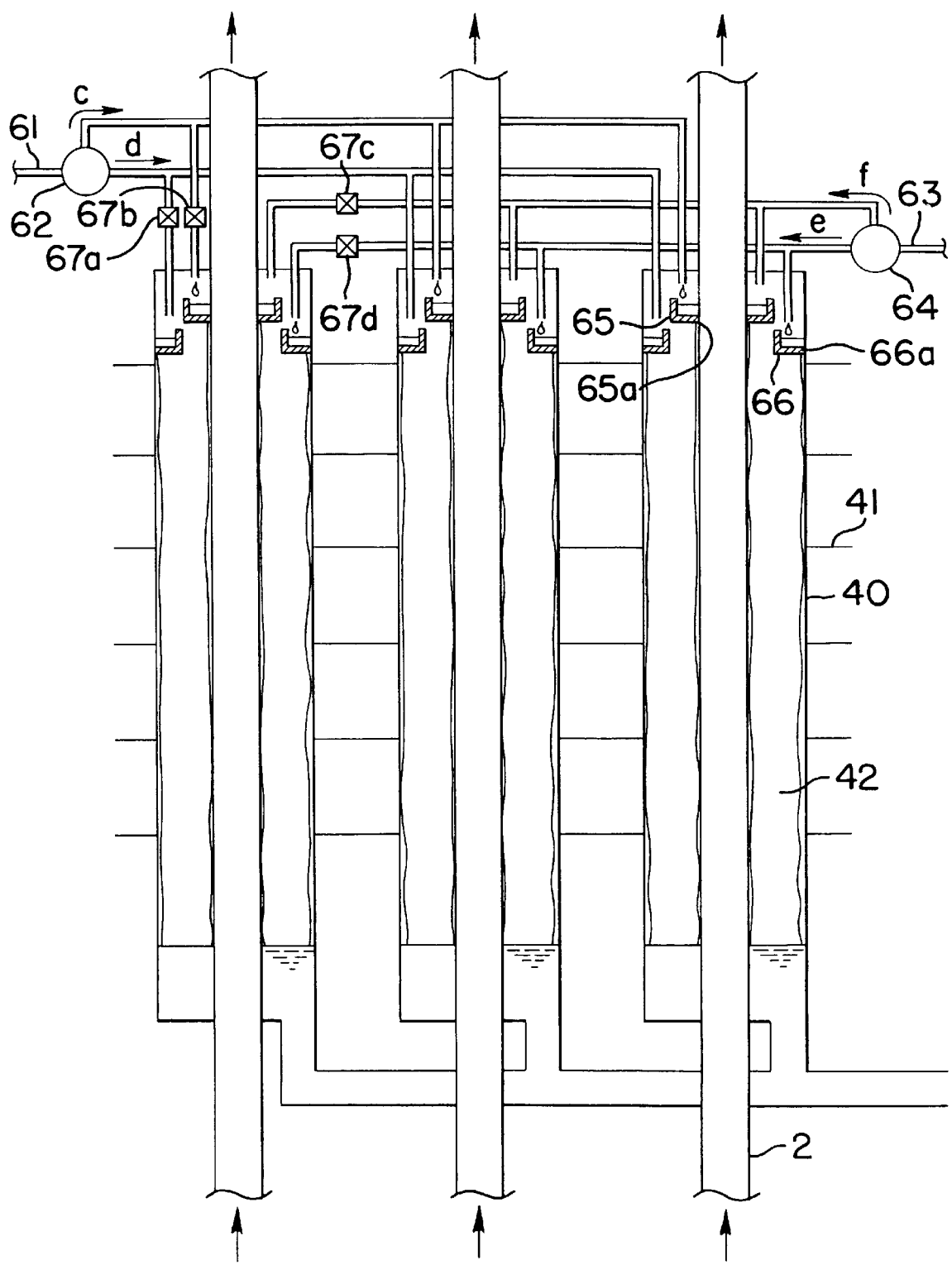
FIG. 2 shows a design layout of the concentric pipes.

As shown in FIG. 2, the first three-way valve 62 is provided on the water passage way 61 from the condenser 30 to the evaporation-absorption chambers 42. By switching the first three-way valve 62 as indicated by arrow c, water drips down into a circular reception tray 65 provided on the outer surface of water pipes 2 in the evaporation absorption chambers 42. This water flows along the outer surface of water pipes 2 from holes 65a provided on the reception tray 65. In addition, by switching the first three-way valve 62 to the arrow d side, the water drips down to a circular receptor tray 66 provided on the inner surface of the outer pipes 40 and flows along the inner surface of the outer pipes 40 from holes 66a provided on the reception tray 66. Similarly, the second three-way valve 64 is provided on the passage 63 of the high concentration liquid fed from the low temperature separator 21 through the low temperature heat exchanger 45. By switching the three way valve 64 to the direction of arrow e, the high concentration liquid drips down onto the inner surface of the outer pipes 40 in the evaporation-absorption chambers 42. By switching the second three way valve to the arrow f side, the high concentration liquid drips onto the outer surface of water pipes 2. In addition, electromagnetic valves 67a, 67b, 67c and 67d are provided on the water and liquid passages to the left-most evaporation absorption chamber 42 in FIG. 2.

The operation of the air-cooled absorption-type air-conditioning equipment will now be explained. During the cooling operation, the first three-way valve 62 is switched to the arrow c side and the second three-way valve is switched to the arrow e side. The fan 50 blows air in the direction (arrow g) from the outer pipes 40 to the condenser 30 where they are cooled. When steam is generated by the heat of burner 1 from the low concentration liquid which flows in the fin-tube-type heat exchanger 10a of the high temperature regenerator 10, the high temperature separator separates the steam or coolant vapor and the intermediate-concentration liquid. The intermediate-concentration liquid flows to the low temperature regenerator 20 after lowering its temperature using the high temperature heat exchanger 46 and is then re-heated by the steam from the high temperature separator 11 when the intermediate-concentration liquid flows through the fin-tube-type heat exchanger 20a. Then, the intermediate-concentration liquid is separated into steam or coolant vapor and high-concentration liquid by the low temperature separator 21. After reducing the temperature of the high-concentration liquid by the low temperature heat exchanger 45, the high-concentration liquid is dripped onto the inner surface of the outer pipes 40. The steam or coolant vapor is cooled and condensed in the condenser 30, into liquid coolant and dripped onto the outer surface of water pipes 2 in the evaporation-absorption chambers 42. The water which is dripped evaporates because of the low pressure and cools the water flowing in water pipes 2 by removing the evaporation heat. The room unit performs the cooling operation by using the chilled water which circulates in the water pipe 2. The steam or coolant vapor is immediately absorbed by the high-concentration liquid. At this time, absorption heat is released by the high-concentration liquid on the inner surface of the outer pipes 40. However, the heat is removed by the air from fan 50. The high-concentration liquid, after absorbing the evaporated coolant, becomes a low-concentration liquid and pump 44 circulates the liquid to the low temperature heat exchanger 45 and then to the high temperature heat exchanger 46 where its temperature is increased. Afterwards, the liquid is heated further in the high temperature regenerator 10.

The heating operation will now be explained. During the heating operation, the first three-way valve 62 is switched to the arrow d side and the second three-way valve 64 to the arrow f side. The fan 50 runs in a reverse direction to that of the cooling operation and the air flows in the direction (arrow h) from the condenser 30 to the outer pipes. Liquid coolant from the condenser 30 is dripped onto the inner surface of the outer pipes 40 in the evaporation-absorption chambers 42 where it evaporates due to the low pressure, and removes the heat which corresponds to the evaporation heat from the outer pipes. Thus, the outer pipes 40 are cooled. However, the outer pipes 40 are prevented from overcooling because the fan 50 causes warm air generated by the heat from condenser 30 to flow to the outer pipes 40. The water vapor or evaporated coolant is immediately absorbed by the high-concentration liquid on the outer surface of water pipes 2. At this time, the absorption heat generated by the high-concentration liquid warms up the water which flows in water pipes 2. The room unit performs the heating operation using the warm water which circulates in water pipes 2.

During a low capacity operation, the heat from burner 1 in the high temperature regenerator 10 is reduced and less steam or coolant vapor is generated. Therefore, the water that drips into the evaporation-absorption chambers 42 is decreased and the quantity of water dripped in each of the evaporation absorption chambers 42 becomes uneven. There may be one or more evaporation-absorption chambers 42 which does not have water dripping. In such a case, the high-concentration liquid is cooled without being diluted. Then, there is a concern that the high-concentration liquid will crystallize. Therefore, in this instance, the electromagnetic valves, 67a, 67b, 67c and 67d, are closed during a low capacity operation. Thus, by reducing the number of evaporation-absorption chambers 42 to which water and liquid are provided, the water supply to each working chamber increases and thus crystallization of the high concentration-liquid is prevented.

As explained above, by using the air-cooled absorption-type air-conditioning apparatus of this example, during the cooling operation, the outer pipes 40 are cooled first by causing the air from fan 50 to flow in the direction from the outer pipes 40 to the condenser 30. Furthermore, overcooling and freezing of the outer pipes 40 are prevented during the heating operation because the heat generated at the condenser 30 passes over outer pipes 40 as a result of the air flowing in the direction from the condenser 30 to the outer pipes 40. Because the design provides an air tight seal of condenser 30 and the outer pipes 40 within case 51 and the fan 50 causes air to flow over each set of fins 31 and 41, external air introduced through vents 51a definitely flows in the direction from the fins 31 of the condenser 30 to the fins 41 of the outer pipes 40 and hence the efficiency is excellent even when the air flow direction by fan 50 is switched to the heating operation. By having a design in which only the rotation direction of the fan 50 is changed, the cost can be reduced. By having a design in which evaporation and absorption are performed in the evaporation-absorption chambers formed between water pipes 2 and the outer pipes 40, the structure is simple and therefore the apparatus is small and light, and at the same time its cost can be reduced. By performing evaporation and absorption on the surfaces which are facing each other within the evaporation-absorption chambers 42, the coolant vapor is absorbed efficiently in the high concentration liquid.

Further, water pipes 2 are cooled or heated from the surface of the pipe and therefore the efficiency is very good. By providing separate multiple evaporation-absorption chambers 42, the volume of each chamber can be decreased and, consequently, the wall thickness necessary to withstand the low pressure is less. By changing the number of evaporation-absorption chambers 42 to be used, depending on the capacity, crystallization of the liquid can be avoided. By providing the fin-tube-type heat exchangers 10a and 20a on the high temperature regenerator 10 and the low temperature regenerator 20, the necessary amount of lithium bromide liquid is reduced within the apparatus compared to a boiler type structure. Therefore, the start-up time of the operation is reduced and the weight of the apparatus is also reduced. By using the fin-tube-type heat exchangers, the efficiency of the liquid heating is improved. By having similar structures for the fin-tube-type heat exchangers 10a and 20a of the high temperature regenerator 10 and low temperature regenerator 20, respectively, or the high temperature separator 11 and low temperature separator 21, production costs can be reduced.

In this illustrated example, a double effect absorption cycle is used but a single effect absorption cycle can also be used. The regenerators can also have a liquid-storage-type boiler structure. The shape of the concentric pipes need not be restricted to circular cylinders. For example, the concentric tubes can be formed by using different-sized concentric tubes with a polygon cross-section.

During a low capacity operation in this illustrated example, the number of evaporation-absorption chambers 42 used was reduced by one. But, the number can be reduced by more than one at one time and it can also be reduced by multiple steps depending on the capacity. The number of the chambers can also be kept constant irrespective of the capacity. Also the coolant and absorbent are not limited to water and lithium bromide.

As explained in detail above, by using the air-cooled absorption-type air-conditioning apparatus of this invention, the outer pipes can be cooled first during a cooling operation by having a fan directing air from the outer pipes to the condenser. During heating operation, by directing air from the condenser to the outer pipes, the air having its temperature increased by the condenser, flows over the outer pipes, and, therefore, freezing on the outer pipes is prevented. Also, because the design is fairly simple in that only the air flow direction from the fan needs to be reversed, the cost can be reduced.

Furthermore, by using the air-cooled absorption-type air-conditioning apparatus of this invention, the apparatus is constructed so that the air flow from the fan passes almost entirely over the fins of the condenser and the outer pipes. In addition, the cooling and heating efficiency of the condenser and outer pipes is very good regardless of the air flow direction from the fan.

In the above, it is understood that the example of this invention is merely illustrative of the many possible specific embodiments which represent applications of the present invention. This invention is not limited to this example. Various modifications can readily be devised in accordance with the principles of the invention which are here disclosed without departing from the spirit and scope of this invention.

What is claimed is:

1. An air-cooled absorption-type air conditioning apparatus to perform a cooling operation or a heating operation comprising:

a regenerator to heat an absorption liquid, and to separate it into a higher concentration absorption liquid and a coolant vapor;

a condenser having external fins to condense the coolant vapor from the said regenerator into a liquid coolant;

an air conditioning device to adjust the air temperature by thermal media circulating in circulation pipes;

outer pipes having external fins formed concentrically around the outer circumference of said circulation pipes to form chambers between said circulation pipes and said outer pipes;

a fan to blow air to said condenser and said outer pipes;

means to perform the cooling operation by chilling the thermal media circulating in the circulation pipes by spraying liquid coolant from said condenser onto the outer surface of said circulation pipes in said chambers formed between said circulation pipes and said outer pipes, and spraying absorption liquid from said regenerator onto the inner surface of said outer pipes;

means to perform the heating operation by heating the thermal media circulating in said circulation pipes by spraying liquid coolant from said condenser onto the inner surface of said outer pipes and spraying absorption liquid from said regenerator onto the outer surface of said circulation pipes in said chambers; and whereby said fan blows air in the direction from said outer pipes to said condenser during the cooling operation and in the direction from said condenser to said outer pipes during the heating operation.

2. The air-cooled absorption-type air-conditioning apparatus of claim 1 in which:

said condenser has external fins;

said outer pipes have external fins;

said external fins of said condenser and outer pipes, and said fan are contained within the same housing; and whereby the air flow in both directions during the cooling and heating operations of said fan substantially flows over the fins of said condenser and said outer pipes.

* * * * *